(No Model.)

L. EICKE.
DRILL STOCK.

No. 283,473. Patented Aug. 21, 1883.

WITNESSES:
Jos. H. Rosenbaum.
Otto Risch.

INVENTOR
Louis Eicke
BY Paul Goepel
ATTORNEY

UNITED STATES PATENT OFFICE.

LOUIS EICKE, OF NEW YORK, N. Y.

DRILL-STOCK.

SPECIFICATION forming part of Letters Patent No. 283,473, dated August 21, 1883.

Application filed March 21, 1883. (No model.)

*To all whom it may concern:*

Be it known that I, LOUIS EICKE, of the city, county, and State of New York, have invented certain new and useful Improvements in Drill-Stocks, of which the following is a specification.

Piano-makers and other wood-workers who have to drill a large number of holes have heretofore employed drill-stocks in which a spirally-grooved ivory pulley is secured to fixed pins of a revolving spindle and retained by heads that are secured to the spindle. The fastening-pins were applied to interior grooves of the ivory pulley, which caused the pulley to get loose on the spindle by the strains exerted thereon in drilling by the cord of a hand-bow. The pulley was thereby liable to crack, and had then to be replaced, which was connected with considerable expense.

The object of this invention is to improve the drill-stocks for piano-makers in such a manner that the disadvantages referred to are dispensed with, and that a more durable and effective tool is obtained; and the invention consists of a spindle, to the screw-threaded portion of which an ivory pulley is secured and then firmly held between a fixed and a detachable head, the latter being applied to a screw-thread on the spindle, cut in opposite direction to that of the pulley.

Figure 1:
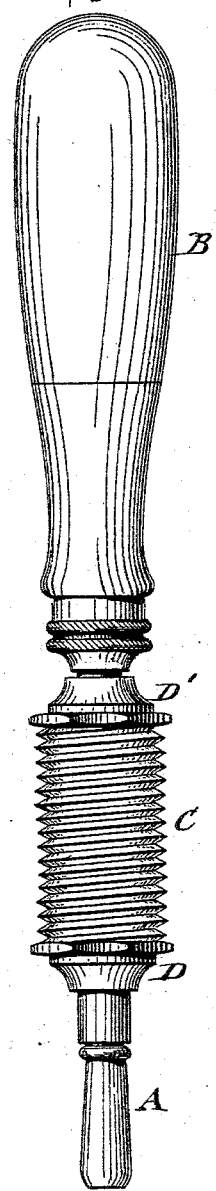
Figure 2:
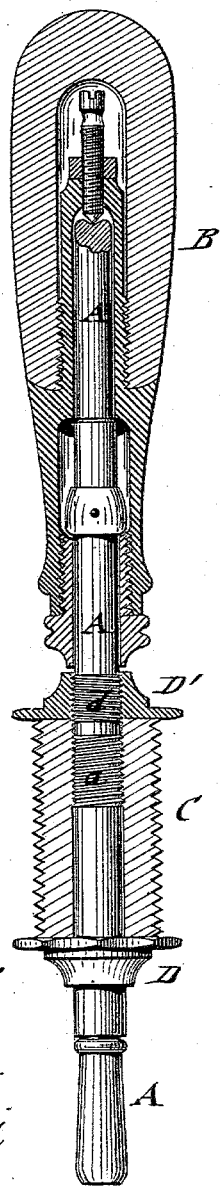
Figure 3:
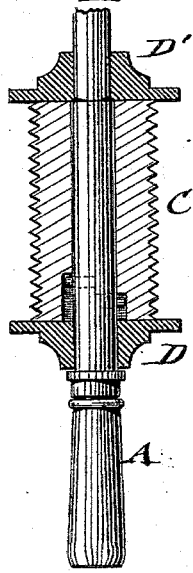

In the accompanying drawings, Figures 1 and 2 represent a side elevation and a vertical central section of my improved drill-stock for piano-makers; and Fig. 3 is a vertical central section, showing the construction of the drill-stocks heretofore in use.

Similar letters of reference indicate corresponding parts.

A in the drawings represents the spindle of a drill-stock for piano-makers or other wood-workers; B, the hollow handle of the same, which is provided at its interior with a neck and step-bearing for the spindle A, as shown in Fig. 2. The handle B is made of three parts—an end or butt portion that is screwed over the threaded shank of the middle part, which latter is again screwed over the threaded portion or retaining-nut which forms the opposite terminal of the handle. The spindle A is first passed through the inner nut portion of the handle B and retained at the end of the same by a collar secured by a key driven transversely through the collar and spindle. The middle part of the handle is then screwed onto the nut part and the step-bearing at the end of the middle portion applied to the end of the spindle. The outer or butt end of the handle is then screwed over the middle part. The construction of the handle as thus far described has been used heretofore, and I do not claim the same.

To the outer socket end of the spindle A is applied a drilling-tool in the usual manner.

A spirally-grooved ivory pulley, C, is screwed by an interior screw-thread, $a$, onto a correspondingly-threaded portion, $a$, of the spindle A and retained rigidly in position thereon by disk-shaped heads D D', of which the lower one is driven rigidly onto a shoulder of the spindle A, while the upper head, D', is screwed thereto by means of a screw-thread, $d$, that is cut in opposite direction to the screw-thread $a$ of the pulley C. The ivory-pulley C and the head D' are placed in position by being slipped over the longer end of the spindle above the fixed head D and before the spindle is inserted into the handle, as before described.

The ivory pulley is thereby firmly applied to the spindle A, held tightly between the heads D D', and thus prevented from shifting on the spindle by the action of the driving-cord, so that no internal strains are exerted in the pulley by which it will be liable to crack or be otherwise injured. The drill-stock will consequently be more durable and adapted in a high degree to resist the wear to which it is exposed by the concussions and strains exerted thereon in working the same.

Having thus described my invention, I claim as new and desire to secure by Letters Patent—

As an improvement in drill-stocks for piano-makers, the combination of the spindle A, having a fixed head, D, and screw-threaded portion $a$, with a spirally-grooved ivory pulley, C, screwed on the threaded portion $a$ and secured by a second head, D', that is screwed onto a threaded portion, $d$, of the spindle, cut in opposite direction to the thread $a$, substantially as and for the purpose specified.

In testimony that I claim the foregoing as my invention I have signed my name in presence of two subscribing witnesses.

LOUIS EICKE.

Witnesses:
PAUL GOEPEL,
SIDNEY MANN.